United States Patent Office 2,740,816
Patented Apr. 3, 1956

2,740,816

EXTRACTION OF AUREOMYCIN

Edward Everett Starbird, Nanuet, and Charles Pidacks, Spring Valley, N. Y., assignors to American Cyanamid Company, New York, N. Y., a corporation of Maine No Drawing. Application September 12, 1950, Serial No. 184,515

4 Claims. (Cl. 260—559)

This invention relates to a method for the separation of the antibiotic known as aureomycin from certain impurities with which it may be associated.

An object of this invention is to separate the aureomycin from any impurities with which it may occur and particularly from mycelia, nutrients, metabolic products, filter aids, etc. with which it is associated or may become associated during its production by fermentation or purification or manufacture.

It is an object of this invention to separate aureomycin from any materials with which it may occur, particularly materials not soluble in acidified lower aliphatic alcohols. Many of the impurities which in the past have been most difficult to separate from aureomycin are not soluble in the acidified lower aliphatic alcohols. This applies to aureomycin whether found associated with impurities as a salt with an acid, the free aureomycin, or the salt with a metal. In the acidified lower aliphatic alcohol solution, the aureomycin probably exists as a salt with an acid, but it may be converted to any desired form during the process of its separation from the solvent, or later.

This application is a continuation-in-part of application Serial Number 62,722 filed November 30, 1948, entitled Isolation of Aureomycin, and application Serial Number 62,766 filed November 30, 1948, entitled Isolation of Antibiotic. Both applications are abandoned in favor of application, Serial Number 364,182, filed June 25, 1953, entitled Chlortetracycline Purification and Alkaline Earth Salts. In Serial Number 62,722, there is disclosed at page 6, lines 2 and 3 that aureomycin may be separated from a cake by the use of solvents, listing among others, the alcohols.

We have found that the lower aliphatic alcohols give particularly satisfactory results especially when the extraction is conducted at a pH of less than about 4. Alcohols with 2 to 5 carbon atoms are preferred. Of the lower aliphatic alcohols n-butanol possesses volatility characteristics, solubility characteristics and a specific gravity which renders it peculiarly suitable for use as the extracting solvent. Additionally, aureomycin is comparatively soluble in acidified n-butanol and many of the impurities with which the aureomycin has previously been found to associate are comparatively insoluble in this acidified butanol.

Our process may be used on a wide variety of materials in which aureomycin is present. Our process may be used in conjunction with any or all of several other purification procedures each of which separates certain of the undesired materials with which the aureomycin may be found.

Among others, one source of impure aureomycin is an alkaline cake which has been separated from the fermentation mash. Many of the fermentation procedures currently being used result in the formation of a final mash liquor in which the aureomycin is partially present in solution and partially present as a precipitate. If calcium is present, the precipitate may be the calcium salt of aureomycin. Other common salts include the barium, the strontium or magnesium salts, any or all of which may be present. In the presence of an excess of any of these metallic ions, a large proportion of the aureomycin precipitates, particularly if the pH of the fermentation liquor is within the range of 6 to 10. The best recoveries usually occur if the separation is conducted at a pH within the range of about 7 to 8.5. The precipitated aureomycin may then be separated from the soluble materials and such separation may be aided by the use of a filter aid. The thus separated solids present the aureomycin-containing cake in an alkaline condition. The preparation of this cake is described in detail and claimed in our application Serial Number 62,722.

An aureomycin-containing solid material may be obtained by precipitating the aureomycin from an aqueous solution containing it by shifting the pH to within the range of about 5 to 7, in which case it precipitates as neutral aureomycin which, of course, may contain certain impurities.

Other aureomycin-containing solids result from evaporation of a solution containing aureomycin, etc.

Any of these solids or cakes may then be treated in accordance with this invention by suspending them in a lower aliphatic alcohol at a pH of less than about 4, whereby the aureomycin is dissolved and the major portion of the impurities remain behind as insoluble materials. The amount of acid for the control of the pH varies to a large extent with the composition of the cake; and particularly if lime is present, comparatively large quantities may be required. The extraction may be repeated. Counter-current or multiple extractions may be used as may various types of extraction columns and extraction equipment. The extraction may be performed on the solids while wet. The extraction may be performed on a dry cake with dry butanol. Better recoveries are obtained if either the cake or the butanol is wet. In dry butanol, aureomycin hydrochloride is soluble to the extent of approximately 500 gammas per cc. In wet butanol, it is soluble to the extent of about 7000 gammas per cc. Surprisingly, it therefore appears that if the wet cake is used, not only is the process simplified because it is not necessary to dry the cake, but additionally a more efficient process is obtained. It is particularly convenient when the solids have been separated from aqueous solutions to use them wet and thus save the cost of drying. The extraction may be performed at any convenient temperature. Between 10° C. and 55° C. the operation is more convenient. A smaller quantity of solvent may be used if the extraction is performed hot and the solution is less viscous so that separation is easier. The extraction may be efficiently performed at room temperature though, thus saving the equipment necessary for handling hot solvents.

Various acids, such as hydrochloric, sulfuric, phosphoric, acetic, etc. may be used for the pH control. Hydrochloric and sulfuric are the most economical. We prefer the use of hydrochloric as thereby the aureomycin may be more easily recovered as the hydrochloride salt, but sulfuric acid is very economical, particularly if large amounts of lime must be neutralized, and the sulfate salt of aureomycin is easily transformed to the hydrochloride during subsequent processing steps if desired.

We prefer to extract within the pH range of about 1 to 2.5. More acid solutions require the use of larger amounts of acid and more corrosion resistant equipment without a commensurate increase in yield. If the pH is above about 2.5, the extraction is not as complete and is slower than in the preferred range. Any of the lower aliphatic alcohols may be used, but n-butanol exhibits great solvent properties for aureomycin in the acid ranges. It is cheap, is less hazardous than some of the other alcohols from the standpoint of fire, toxicity, and is easily recovered. It is desirable that an alcohol be used which may be removed from the extract at a temperature not in excess of about 55° C. and it is desirable that a solvent be used in which the impurities which occur with aureomycin are comparatively insoluble.

It is also preferred that one be used which is comparatively immiscible with water and one from which any residual water is preferentially removed during distillation. Normal butanol exhibits all of these characteristics.

The quantity of the solvents varies with the pH and the efficiency of the solvent. At a pH within the preferred range, n-butanol gives excellent recoveries if two extractions are performed. On the recovery of aureomycin from fermentation cake, volumes equal to about 20% of the original mash volume for each extraction give an efficient recovery. The exact volume used and the number of extractions may be varied within wide limits.

The various extracts containing the aureomycin may then be combined and the aureomycin recovered therefrom. This is easily done if the alcohol is removed by distillation. To avoid damage to the aureomycin, it is preferred that the distillation be conducted below a maximum temperature of about 55° C. The alcohol distilled over may, of course, be re-used. The amount of water which will remain behind with the alcohol varies, of course, with the alcohol being used. With n-butanol, the water distills over as an azeotrope leaving as the residual solvent dry butanol. The acidity of the residue depends in part upon the acid being used. If hydrochloric acid is used, some of the acid may distill over and additional acid may be required to assist in the crystallization of the aureomycin.

Generally, the solvent is distilled off until the aureomycin is at least sufficiently concentrated to precipitate when the concentrate is cooled. We have found improved recoveries occur if the solvent is distilled over until the aureomycin starts to precipitate out while hot and may be continued until a fairly thick slurry is formed. As a matter of operating convenience, we find it convenient to concentrate the solvent to about $\frac{1}{20}$ of its original volume. The slurry may then be chilled and the aureomycin separated out. For best recoveries it appears desirable that the slurry be rather acid at this point and it may well be adjusted to a pH of about 0.8 by the addition of hydrochloric acid.

After chilling, the crystals may be separated, then washed and dried. The washes for the crystals may be at least one from the group consisting of n-butanol, ethyl Cellosolve, ethyl alcohol, and water. Best results are obtained when at least two of these solvents in succession are used to wash the crystals. It is usually desirable that the subsequent wash be performed before the crystals dry.

If an acid other than hydrochloric is used for the acidification in the original extraction, the acid radical may be changed by shaking the extract with a suitable salt. If sulfuric acid is used in the original extraction and the solvent used is butanol, a saturated sodium chloride wash may be shaken with the solvent which will result in a change of the aureomycin in solution from the sulfate to the hydrochloride salt. Other changes may be made if desired. The aureomycin is usually desired as the hydrochloride.

*Example 1*

A cake containing aureomycin from the filtration with alkaline fermentation liquor was treated with 20% by volume of the original mash liquor of n-butanol at room temperature at a pH of 1.4 being made acid with 9 N sulfuric acid. The butanol cake and acid were slurried together for ten minutes after the desired pH was reached and then the cake was filtered. The resultant cake was again slurried with a 20% by volume of butanol for ten minutes at a pH of 1.4 and the butanol and cake separated. The first extract contained 64.8% of the aureomycin originally present and the second extraction, 18%. The butanolic extracts were pooled and shaken with 30% sodium chloride solution. The upper solvent phase was separated and the mixture concentrated under vacuum until the aureomycin began to pricipitate, after which it was chilled, adjusted to a pH of 0.8 with hydrochloric acid and the aureomycin separated by filtration. The resultant product was the hydrochloric acid salt of aureomycin.

*Example 2*

9.5 liters of an aureomycin fermentation mash assaying 1185 gammas per cc. had added thereto 1% on a weight by volume basis of diatomaceous earth. The mash was filtered, giving approximately 1 kilogram of a wet cake. The cake was extracted with 1.9 liters of anhydrous butanol, the butanol separated, and the residue again extracted with 1.9 liters of wet butanol. This last extraction was repeated. The first extraction was performed at a pH of 1.30 which required the addition of approximately 170 cc. of 6 normal hydrochloric acid. The second and third extractions were performed after the addition of 13 cc. of 6 normal hydrochloric acid with the pH's of 1.46 and 1.35 respectively. The aureomycin analyses on the three batches were, for the first extraction 1760 cc. of extract at 5690 gammas per cc. The second, 1920 cc. at 910 gammas per cc. The third, 1929 cc. at 220 gammas per cc. (Due to uncertainties in the analyses there is not obtained an exact balance.) The butanol extracts were pooled and the butanol removed under vacuum at a temperature between 45 and 55° C. to approximately 5% of the original butanol volume. To the concentrate was added 1.10 cc. of Cellosolve and 13 cc. of 6 normal hydrochloric acid. The concentrate was allowed to age at room temperature for 18 hours and for 7 hours at 4° C. The material was filtered, washed with 15 cc. of Cellosolve, 12 cc. of water, 12 cc. of anhydrous alcohol, and then dried.

*Example 3*

To 12 liters of mash at a pH of 7.2 was added 24 cc. of 10 normal sodium hydroxide and 180 grams of siliceous earth. The resulting slurry was filtered, yielding 1350 grams of a wet mycelial cake. A 200 gram portion of this cake was extracted twice with 360 cc. of butanol, the first extract, dry butanol, and the second extract, wet. The first extraction was performed at a pH of 0.38 by the addition of 65 cc. of concentrated hydrochloric acid, and the second at a pH of 0.32 by the addition of 30 cc. of concentrated hydrochloric acid. The extracts were pooled, the aqueous layer discarded and the extract concentrated to 40 cc. under vacuum at a temperature between 45 and 55° C. To the concentrate was added 16 cc. of Cellosolve, the mixture permitted to stand for 18 hours at room temperature, then 4 hours at 4° C. The crystals were separated and washed with 4 cc. of Cellosolve, 3 cc. of water and 3 cc. of anhydrous alcohol, and dried.

*Example 4*

1.9 liters of a mash assaying 940 gammas per cc. were adjusted to a pH of 8.6 with 10 normal caustic soda. To this was added 28 grams of diatomaceous earth, and the mixture filtered. The cake was made acid with 52 cc. of 6 normal hydrochloric acid and was extracted once with 450 cc. of isopropyl alcohol. The solids were again extracted with 450 cc. of isopropyl alcohol after the addition of 7 cc. of 6 normal hydrochloric acid. Both extractions were performed at 55° C. The resulting extracts were pooled and concentrated to 10% of their original volume in vacuo at 35° C. To the concentrate was added $\frac{1}{5}$ of its volume of ethyl Cellosolve and its own volume of anhydrous alcohol. The pH was adjusted to 0.69 with 6 cc. of 6 normal hydrochloric acid. The concentrate was permitted to stand at room temperature for 60 hours and at 4° C. for 4 hours. The material was filtered, washed once with 4 cc. of Cellosolve, then 4 cc. of water and finally with 4 cc. of anhydrous ethyl alcohol. The crystals were dried in vacuo. There was obtained a yield of 1.06 grams of aureomycin hydrochloride assaying 720 gammas per milligram which is a recovery of 38.4%.

*Example 5*

40 liters of mash assaying 1120 gammas per cc. were adjusted to a pH of 8.45 with 53 cc. of 10 normal sodium hydroxide. 800 grams of Hy-Flo Supercel were added and the mixture filtered, yielding 5147 grams of aureomycin cake.

250 grams of the above cake, wet, representing 1945 cc. of the mash, were extracted with 350 cc. of secondary butanol after the addition of 40 cc. of 6 normal hydrochloric acid, the extraction being at a pH of 1.21, there being obtained 366 cc. of an extract assaying 4310 gammas per cc. A second extraction was performed using 485 cc. of secondary butanol and 3 cc. of 6 normal hydrochloric acid at a pH of 1.43, yielding 398 cc. of an extract assaying 690 gammas per cc. The aqueous layer was separated and the butanol extracts combined. The material was concentrated to 5% of its original volume in vacuo at a temperature of 35 to 40° C. To the concentrate was added 0.5 cc. of 6 normal hydrochloric acid, giving a pH of 0.50. The concentrate was permitted to age 18 hours at room temperature and 24 hours at 4° C. The crystals were filtered, washed with 4 cc. of Cellosolve, 4 cc. of water, and 4 cc. of anhydrous alcohol, and dried in vacuo.

*Example 6*

12 liters of aureomycin fermentation mash had added thereto sufficient calcium hydroxide to raise the pH to 7.5, then the mixture was filtered. The cake was suspended in 2.4 liters of normal butanol at a pH of approximately 1.4 using approximately 160 cc. of 6 normal hydrochloric acid for pH control. The butanol cake slurry was stirred for 10 minutes after the desired pH was reached and then filtered. The resultant cake was again slurried with 2.4 liters of normal butanol at the same pH. Approximately 20 cc. of hydrochloric acid was required to maintain the required pH. An aqueous layer resulting from the first extraction was separated from the butanol and discarded as it contained but a small amount of aureomycin. The butanolic extracts were pooled and the butanol partially removed therefrom in a vacuum still. Approximately 450 cc. were retained. The temperature in the still was kept under 55° C. during the entire concentration. The concentrated mixture in which the aureomycin was beginning to precipitate was adjusted to a pH of approximately 0.8 with 1:1 hydrochloric acid, approximately 40 cc. being required. The concentrated butanol was allowed to age for 12 hours at room temperature and then chilled for 6 hours. The crystals were removed by filtration, slurried, and removed from each of Cellosolve, water, and anhydrous ethyl alcohol. The crystals were dried at 40° C.

*Example 7*

7.15 liters of aureomycin mash at a pH of 6.19 were treated with 8.4 cc. of 10 normal sodium hydroxide, and 215 grams of Hy-Flo Supercel added thereto. The mash was filtered, yielding 786 grams of a wet alkaline cake.

This cake was extracted twice with 1570 cc. each of dry normal butanol, at a pH of 1.26 each. The first required 113 cc. of 6 normal hydrochloric acid and the second 5 cc. of 6 normal hydrochloric acid. The butanol layers were separated from the aqueous layers, pooled and concentrated to 250 cc. in vacuo at a maximum temperature of 60° C. 250 cc. of anhydrous ethanol and 50 cc. of Cellosolve were added, and the crystals were aged two hours at room temperature and overnight at 4° C., filtered and washed first with 5 cc. of butanol, 3 times with 5 cc. each of Cellosolve and then 5 cc. of water and finally 10 cc. of ethyl alcohol. The crystals were dried, yielding 6.12 grams of aureomycin hydrochloride with a purity of 580 gammas per milligram, a yield of 55.2% based on the mash activity.

Variations in the above procedures, and minor modifications, will suggest themselves to those skilled in the art.

As our invention we claim:

1. A process for the purification of chlortetracycline which comprises the steps of extracting at a pH less than about 4 the water-wet solids which are precipitated from an aqueous fermentation liquor containing chlortetracycline at a pH within the range 6 to 10 with a saturated, unsubstituted lower aliphatic alcohol having from 2 to 5 carbon atoms to dissolve the chlortetracycline contained therein, separating the alcoholic solution from insoluble matter, removing water from said alcoholic solution and concentrating said solution by evaporation at a temperature less than about 55° C. until the chlortetracycline contained therein precipitates.

2. A process for the purification of chlortetracycline which comprises the steps of extracting at a pH less than about 4 the water-wet solids which are precipitated from an aqueous fermentation liquor containing chlortetracycline at a pH within the range 6 to 10 with n-butanol to dissolve the chlortetracycline contained therein, separating the alcoholic solution from insoluble matter, removing water from said alcoholic solution and concentrating said solution by evaporation at a temperature less than about 55° C. until the chlortetracycline contained therein precipitates.

3. A process for the purification of chlortetracycline which comprises the steps of extracting at a pH less than about 4 the water-wet solids which are precipitated from an aqueous fermentation liquor containing chlortetracycline at a pH within the range 6 to 10 with a saturated, unsubstituted lower aliphatic alcohol having from 2 to 5 carbon atoms to dissolve the chlortetracycline contained therein, separating the alcoholic solution from insoluble matter, removing water from said alcoholic solution and concentrating said solution by evaporation at a temperature less than about 55° C. adding hydrochloric acid to said concentrated solution and allowing the mixture to stand at lower temperature until the chlortetracycline is precipitated as its hydrochloric acid salt.

4. A process for the purification of chlortetracycline which comprises the steps of extracting at a pH less than about 4 the water-wet solids which are precipitated from an aqueous fermentation liquor containing chlortetracycline at a pH within the range 6 to 10 with a saturated, unsubstituted lower aliphatic alcohol having from 2 to 5 carbon atoms to dissolve the chlortetracycline contained therein, separating the alcohol solution from insoluble matter, removing water from said alcoholic solution and concentrating said solution by evaporation at a temperature less than about 55° C. adding ethoxyethanol to said concentrated solution, allowing the mixture to stand and thereafter recovering the product that crystallizes therefrom.

References Cited in the file of this patent
UNITED STATES PATENTS

| | | |
|---|---|---|
| 2,461,922 | Rake | Feb. 15, 1949 |
| 2,482,055 | Duggar | Sept. 13, 1949 |
| 2,516,080 | Sobin | July 18, 1950 |
| 2,586,766 | Pidacks et al. | Feb. 19, 1952 |
| 2,655,535 | Pidacks et al. | Oct. 13, 1953 |

OTHER REFERENCES

Application No. 83,780, Abstracted in 650 O. G. 895, September 18, 1951.

Broschard in Science 109: pp. 199–200, February 25, 1949.

Brook in J. Biol. Chem., vol. 165, October 1946, pp. 463–68.